United States Patent
Fan (10) Patent No.: US 9,597,965 B2
(45) Date of Patent: Mar. 21, 2017

(54) CLUTCH-TYPE ELECTRIC GENERATOR FOR AUTOMOBILE AXLES

(71) Applicant: Ping Fan, New Taipei (TW)

(72) Inventor: Ping Fan, New Taipei (TW)

( * ) Notice: Subject to any disclaimer, the term of this patent is extended or adjusted under 35 U.S.C. 154(b) by 441 days.

(21) Appl. No.: 14/477,022

(22) Filed: Sep. 4, 2014

(65) Prior Publication Data

US 2016/0068072 A1    Mar. 10, 2016

(51) Int. Cl.
| | |
|---|---|
| *H02K 7/10* | (2006.01) |
| *B60L 11/18* | (2006.01) |
| *F16D 43/16* | (2006.01) |
| *H02K 7/18* | (2006.01) |

(52) U.S. Cl.
CPC .......... *B60L 11/1809* (2013.01); *F16D 43/16* (2013.01); *H02K 7/10* (2013.01); *H02K 7/1846* (2013.01)

(58) Field of Classification Search
CPC .................................. H02K 7/10; B60L 11/18
USPC .............. 310/75 C, 76, 77, 78, 82; 180/216; 192/43.1
See application file for complete search history.

(56) References Cited

U.S. PATENT DOCUMENTS

| | | | | |
|---|---|---|---|---|
| 5,818,134 A | * | 10/1998 | Yang | B62M 7/12 180/65.31 |
| 5,913,390 A | * | 6/1999 | Hostetler | F16D 51/22 188/156 |
| 2009/0273249 A1 | * | 11/2009 | Lamperth | B60K 7/0007 310/77 |

FOREIGN PATENT DOCUMENTS

FR    WO 2005116475 A1 * 12/2005 ............. F16D 43/18

* cited by examiner

*Primary Examiner* — Jose Gonzalez Quinones
(74) *Attorney, Agent, or Firm* — Bacon & Thomas, PLLC (57) ABSTRACT

The present invention is to provide a clutch-type electric generator for automobile axles which comprises a casing, a stator housing having a plurality of stators fixed therein, a rotor housing movably configured around the axle and having a plurality of rotors fixed therein, and a clutch mechanism. The axle penetrates the casing and rotates with respect to the casing. The clutch mechanism comprises a passive ring, a clutch disc fixed around the axle and a plurality of clutch shoes; wherein the clutch shoes can be centrifugally moved between the clutch disc and the passive ring via a plurality of connecting rods and elastic devices, and can engage with the passive ring fixed on the rotor housing for enabling the rotors to simultaneously rotate along with the axle and to rotate with respect to the stators to generate induced electricity while the automobile has reached a predetermined speed.

6 Claims, 6 Drawing Sheets

CLUTCH-TYPE ELECTRIC GENERATOR FOR AUTOMOBILE AXLES

FIELD OF THE INVENTION

The invention relates to a clutch-type electric generator for automobile axles, and more particularly to an electric generator comprising a stator housing having a plurality of stators fixed therein, a rotor housing movably configured around the axle and having a plurality of rotors and a passive ring fixed therein, and a clutch mechanism having a clutch disc fixed around the axle and a plurality of clutch shoes, wherein the clutch shoes can be centrifugally moved between the clutch disc and the passive ring via a plurality of elastic devices and connecting rods, and can engage with the passive ring for enabling the rotors to simultaneously rotate along with the axle and to rotate with respect to the stators to generate induced electricity while the automobile reaches a predetermined speed.

BACKGROUND OF THE INVENTION

Since the industrial revolution, modern transportation equipment of various types has gradually become part of daily life and rendered daily living more convenient and faster. Automobiles play a major role in transportation equipment, and they serve not just as transportation means and they have been further equipped with facilities such as air conditioning, stereo systems, television sets, satellite navigation, etc. as technologies progress and develop; therefore, the energy for automobiles needs to be converted into electricity to supply the above interior equipment in addition to driving the wheels.

Figure 1:
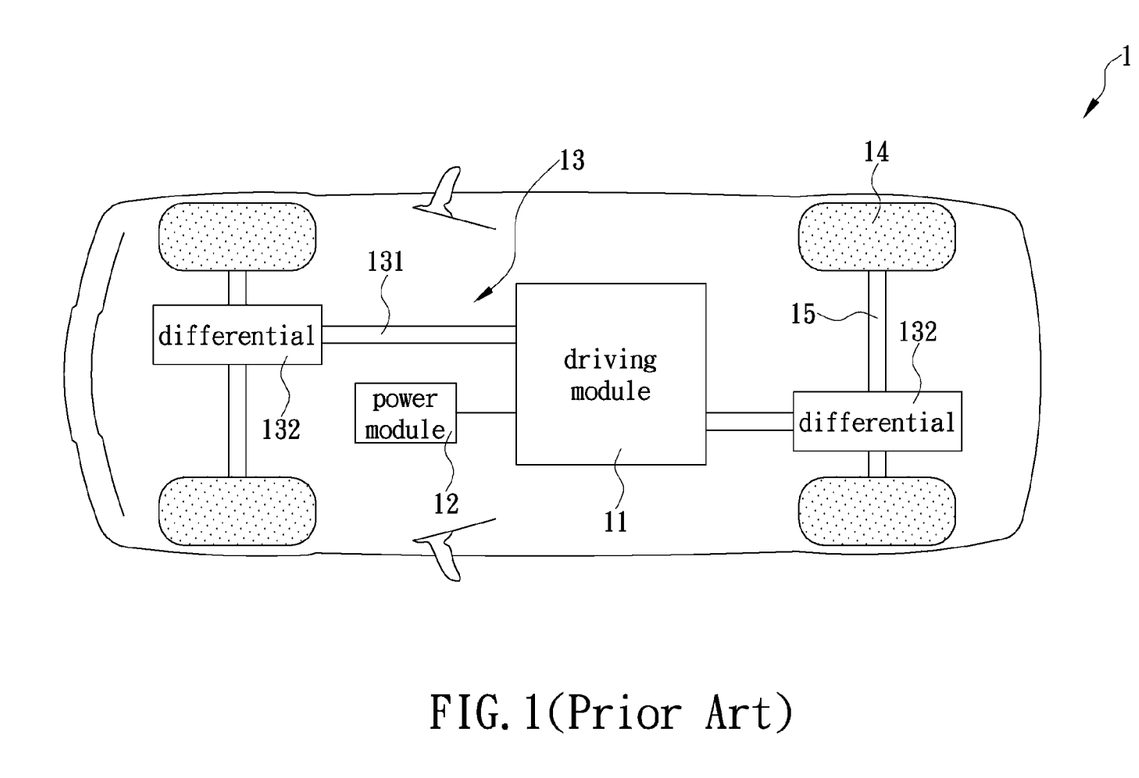
FIG. 1 is a schematic of a conventional automobile.

FIG. 1 shows a simplified schematic of the structure of a contemporary four-wheel-drive automobile; the automobile 1 is configured with a driving module 11 (such as motors and engines), a power module 12 (such as generators, batteries, and control circuits thereof), and a transmission module 13 (such as a gearbox, a drive shaft 131, and differentials 132) inside, wherein the driving module 11 is connected with the power module 12 and the transmission module 13, respectively. When the driving module 11 is operating, kinetic energy is generated by the driving module 11 and rotates a plurality of axles 15 of a plurality of wheels 14 via the transmission module 13 so that the automobile 1 is driven by the plurality of wheels 14 to proceed; in addition, the kinetic energy generated by the driving module 11 also drives the power module 12 to generate electricity and store the generated electricity, where the generated electricity may be used to start the automobile 1 and supply the interior equipment and car lighting.

The equipment used to store the electricity in the power module 12 is the batteries; when the user starts the automobile, the batteries instantaneously provide a large current to a starter in the driving module 11 to start the engine, and generator in the power module 12 may be activated to provide the electricity required by the other interior equipment of the automobile after the engine has successfully started; when the electricity generated by the generator exceeds that required by the interior equipment of the automobile, the excess electricity may be stored in the batteries. However, as the functions of interior equipment have become more and more diversified, the required electricity has also mounted. The power of generators for common medium-sized automobiles was approximately 500 W twenty years ago, yet it has risen to 1000 W nowadays; such demonstrates the rising trend in automobile power consumption. The increase of power consumption means more fuel consumption by the automobile (to drive the generator) and more greenhouse gases to be produced, which is detrimental for the environment and ecology; therefore, present industries and governments have been devoting much effort to seek to employ alternative energy sources for automobiles.

Although hybrid electric automobiles and electric automobiles have already been designed presently, they face difficulties in prevalence due to the production cost and charging station deployment. Considering the fact that electricity is always required for starting the automobile equipment be it conventional automobiles, hybrid electric automobiles, or electric automobiles, the present invention has researched, besides the alternative energy resources, in the field of active electricity generation, where the kinetic energy of the automobile during operation is used to generate electricity to enhance the energy utilization efficiency of the automobile and actively generate the energy to be consumed during the driving of the automobile, and thusly achieving the two benefits of generating electricity and saving energy as well. Therefore, the design of an electricity-generating device that may be conveniently installed on the present automobile structure and uses the kinetic energy of the automobile during operation to generate electricity is the crucial topic to be solved in this invention.

BRIEF SUMMARY OF THE INVENTION

In view of the high cost issues in production, repairing, and maintenance as a result of employing larger power modules with higher battery capacities required to be equipped on current automobiles due to the high energy consumption, years of practice and numerous studies and tests have finally yielded the clutch-type electric generator for automobile axles of the present invention to take advantage of no need to modify current vehicle structures, that is expected to provide a novel technology that is convenient to apply and improves the automobile energy consumption by continuously enhancing operation, and actively generating electricity continuously during the driving of the automobile for the ultimate energy utilization.

A purpose of the invention is to provide a clutch-type electric generator for automobile axles, used on an automobile configured with at least a driving module and a power module, wherein kinetic energy generated by the driving module is transmitted to a plurality of wheels and a plurality of axles of the automobile (if the automobile is four-wheel drive, the driving module drives the plurality of axles via a transmission module; if the automobile is two-wheel drive, the driving module drives part of the plurality of axles while the other wheels rotate as the automobile proceeds) to drive the plurality of wheels and the plurality of axles to rotate when the driving module is operating, wherein the clutch-type electric generator comprises a casing, a stator housing, a rotor housing, and a clutch mechanism; an outer rim of the casing is fixed to a chassis or a suspension device of the automobile, wherein the casing is configured with a containing space inside, and wherein the axle penetrates the casing and rotates with respect to the casing; the stator housing is configured in the containing space and fixed to an inner rim of the casing, wherein the stator housing is configured with a plurality of stators along the perimeter of the axle, and wherein the plurality of stators is electrically connected to the power module; the rotor housing is configured in the containing space and movably configured around an outer rim of the axle by a bearing, wherein the rotor housing is configured with a plurality of rotors along the perimeter of the axle, and wherein each of the plurality of rotors correspond to each of the plurality of stators, respectively, and keeps a predetermined gap with each of the plurality of stators; the clutch mechanism is configured in the containing space and comprises a passive ring, a clutch disc, a plurality of connecting rods, a plurality of clutch shoes, and a plurality of elastic devices; a side of the passive ring is concentrically fixed on a side of the rotor housing so that the passive ring and the rotor housing simultaneously rotate with respect to the axle, and wherein an inner rim of the passive ring is configured with a plurality of first engagement parts along the perimeter; the clutch disc is configured around the outer rim of the axle to simultaneously rotate with the axle; an end of each of the plurality of connecting rods is pivotally connected to the clutch disc; each of the plurality of clutch shoes is pivotally connected to the other end of each of the plurality of connecting rods, respectively, to move between an outer rim of the clutch disc and the inner rim of the passive ring, and wherein each of the plurality of clutch shoes is configured with a second engagement part corresponding to each of the plurality of first engagement parts; each of the plurality of elastic devices has an end connected to the clutch disc and the other end correspondingly connected to each of the plurality of clutch shoes, respectively, to apply elastic force on the plurality of clutch shoes so that a side of each of the plurality of clutch shoes opposite to the second engagement part presses against the outer rim of the clutch disc to keep a predetermined distance between each of the plurality of first engagement parts and each of the plurality of second engagement parts. Therefore, when the axle rotates the clutch disc to generate centrifugal force to engage the plurality of clutch shoes with the inner rim of the passive ring through the first and second engagement parts, the passive ring and the rotor housing rotate accordingly to generate a time-varying magnetic field and subsequently generate induced electricity on the plurality of stators which not only may be used for the interior equipment of the automobile and the driving energy consumption, but the excess electricity may also be stored in the power module for the next starting and low-speed driving.

BRIEF DESCRIPTION OF DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

The principles, structural features, and purposes of the invention may be more fully understood by the subsequent detailed description and examples with references made to the accompanying drawings.

Figure 2:
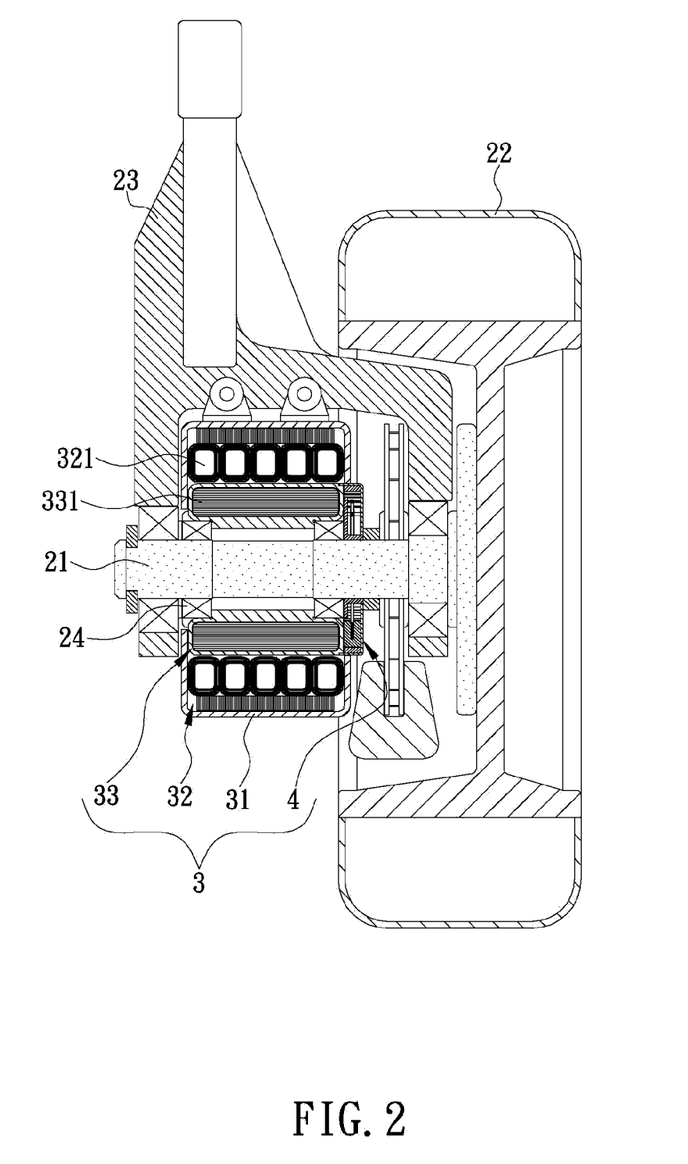
FIG. 2 is a schematic of a clutch-type electric generator of the invention.
Figure 3:
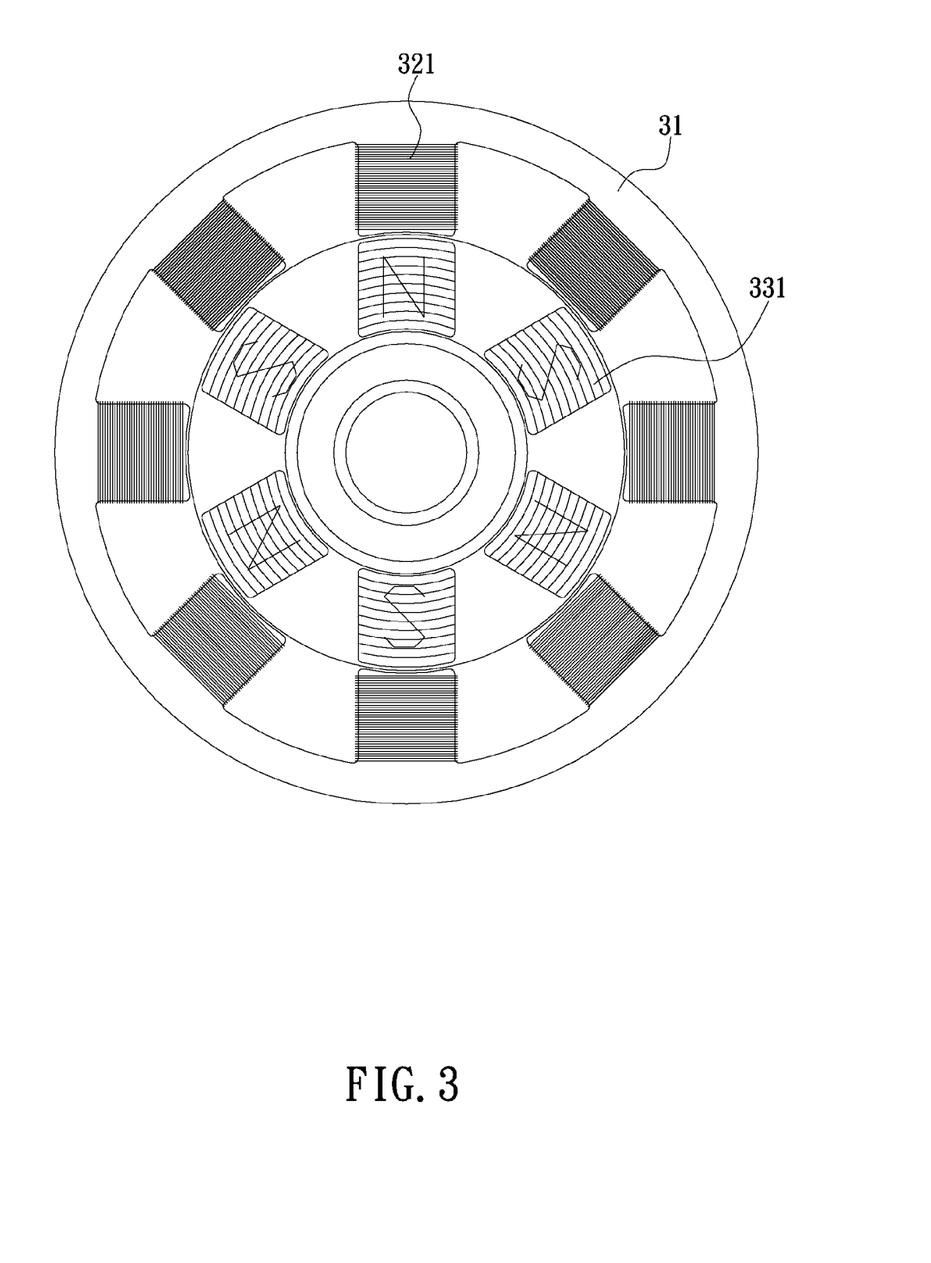
FIG. 3 is a schematic of an arrangement of stators and rotors of the clutch-type electric generator of the invention.

The invention pertains to a clutch-type electric generator for automobile axles, and FIG. 2 and FIG. 3 show a first preferred embodiment of the invention. The clutch-type electric generator 3 is installed on an automobile configured with a driving module, a power module, and a transmission module inside (the automobile structure is as shown in FIG. 1 but the invention is not limited to four-wheel-drive automobiles and may be applied to all mechanisms with relative movements between axles), wherein the driving module is connected with the power module and the transmission module, respectively, and the transmission module is connected to a plurality of wheels 22 via a plurality of axles 21, respectively. When the driving module is operating, the kinetic energy generated by the driving module rotates the plurality of axles 21 and the plurality of wheels 22 sequentially via the transmission module.

The clutch-type electric generator 3 comprises a casing 31, a stator housing 32, a rotor housing 33, and a clutch mechanism 4; an outer rim of the casing 31 is fixed to a suspension device 23 of the automobile (may also be fixed to a chassis of the automobile or between a drive shaft and the chassis of a four-wheel-drive automobile), wherein the casing 31 is configured with a containing space inside which is configured with holes at the front end and the rear end, respectively (the right side of FIG. 2 is denoted as the "front end" and the left side of FIG. 2 is denoted as the "rear end" for convenience), and wherein the axle 21 penetrates the casing 31 via the holes and rotates with respect to the casing 31; the containing space contains the stator housing 32, the rotor housing 33, and the clutch mechanism 4, wherein the stator housing 32 is fixed to an inner rim of the casing 31 and comprises a plurality of stators 321 (such as coils) configured along the perimeter of the axle 21 which is electrically connected to the power module of the automobile.

Referring to FIG. 2 and FIG. 3, the rotor housing 33 is movably configured around an outer rim of the axle 21 by a bearing 24 to be positioned between the stator housing 32 and the axle 21, wherein the rotor housing 33 comprises a plurality of rotors 331 (such as field magnets) also configured along the perimeter of the axle 21, and wherein each of the plurality of rotors 331 correspond to each of the plurality of stators 321, respectively, and keeps a predetermined gap with each of the plurality of stators 321 (FIG. 3 shows a schematic of the arrangement of the stators 321 and the rotors 331; only the casing 31, the stators 321, and the rotors 331 are shown in FIG. 3 for simplicity).

Referring to FIG. 2 to FIG. 5, the clutch mechanism 4 is configured near the wheel 22 in the casing 31 (in this embodiment, the clutch mechanism 4 is inserted in the hole at one end of the casing 31) and comprises a passive ring 41, a clutch disc 42, a plurality of connecting rods 43, a plurality of clutch shoes 44, and a plurality of elastic devices 45; a side of the passive ring 41 is concentrically fixed on a side of the rotor housing 33 so that the passive ring 41 and the rotor housing 33 simultaneously rotate with respect to the axle 21 with the axle 21 as the center, wherein an inner rim of the passive ring 41 is configured with a plurality of first engagement parts 411 along the perimeter.

Figure 5:
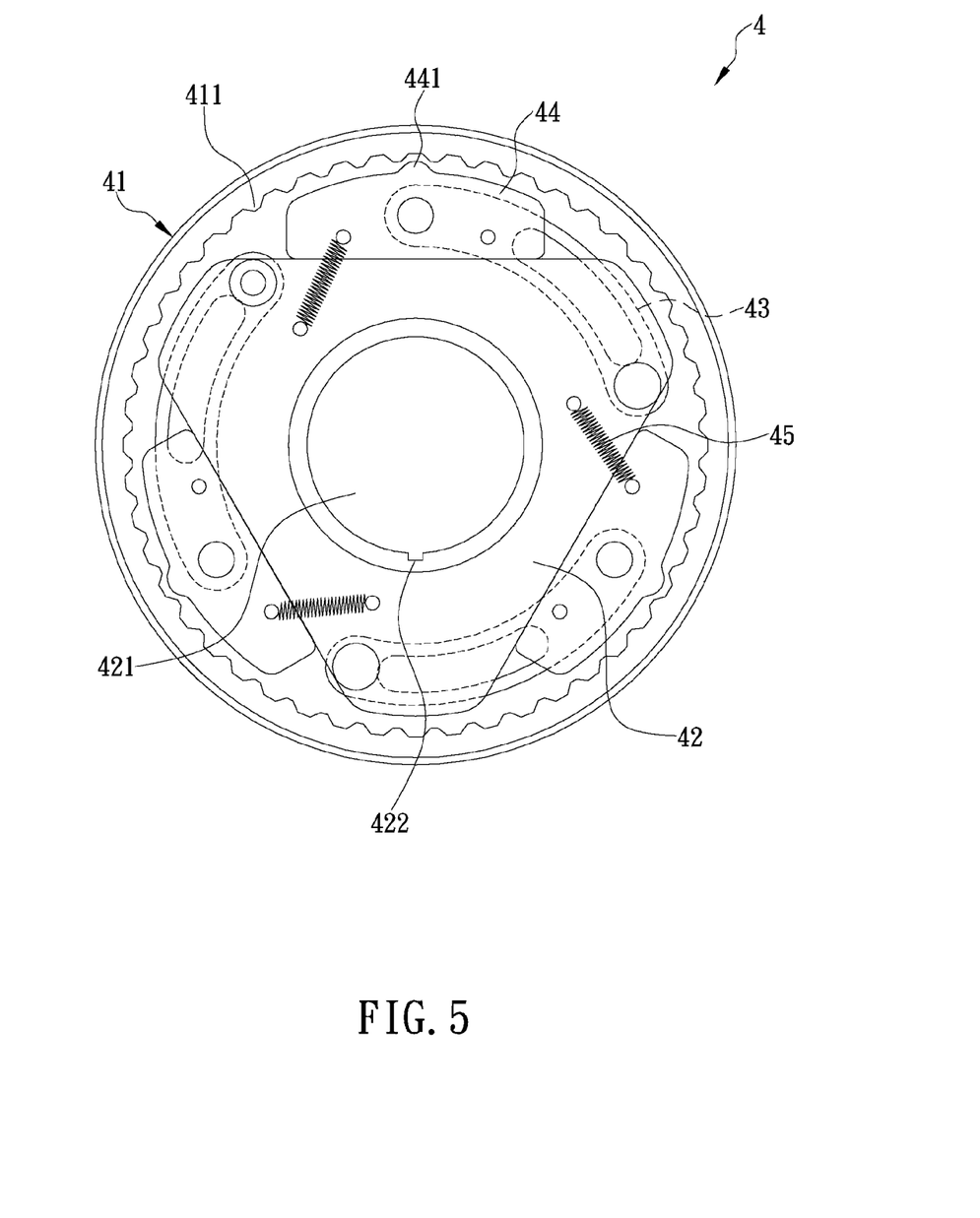
FIG. 5 is an operation schematic of the clutch-type electric generator of the invention.

Referring to FIG. 2 and FIG. 5, the clutch disc 42 is positioned in a hollow portion of the passive ring 41 and a penetrating hole 421 is configured at the center of the clutch disc 42, wherein the penetrating hole 421 is configured with an engagement groove 422 so that the axle 21 penetrates the penetrating hole 421 and engages with the engagement groove 422 (e.g., a protrusion may be configured on the axle 21 at a position corresponding to the engagement groove 422) so that the clutch disc 42 is simultaneously rotated by the axle 21; an end of each of the plurality of connecting rods 43 is pivotally connected to the clutch disc 42; a middle section of each of the plurality of clutch shoes 44 is pivotally connected to the other end of each of the plurality of connecting rods 43, respectively, to move between an outer rim of the clutch disc 42 and the inner rim of the passive ring 41, wherein each of the plurality of clutch shoes 44 is configured with a second engagement part 441 corresponding to each of the plurality of first engagement parts 411.

Each of the plurality of elastic devices 45 has an end connected to the clutch disc 42 and the other end correspondingly connected to each of the plurality of clutch shoes 44, respectively, to apply elastic force on the plurality of clutch shoes 44 so that a side of each of the plurality of clutch shoes 44 opposite to the second engagement part 441 presses against the outer rim of the clutch disc 42 to keep a predetermined distance between each of the plurality of first engagement parts 411 and each of the plurality of second engagement parts 441, i.e., the clutch disc 42 and the plurality of clutch shoes 44 are not connected with the passive ring 41.

Therefore, when the clutch disc 42 is simultaneously rotated by the axle 21 but the rotation speed (i.e., the rotation speed of the axle 21 or the wheel 22) is not able to generate a sufficient centrifugal force for the plurality of clutch shoes 44 to overcome the elastic force, the plurality of first engagement parts 411 does not engage and mesh with the corresponding plurality of second engagement parts 441 and thus the passive ring 41 along with the rotor housing 33 do not rotate with the axle 21 (as shown in FIG. 5); in other words, the kinetic energy generated by the automobile at this time does not simultaneously drive the rotor housing 33.

Figure 4:
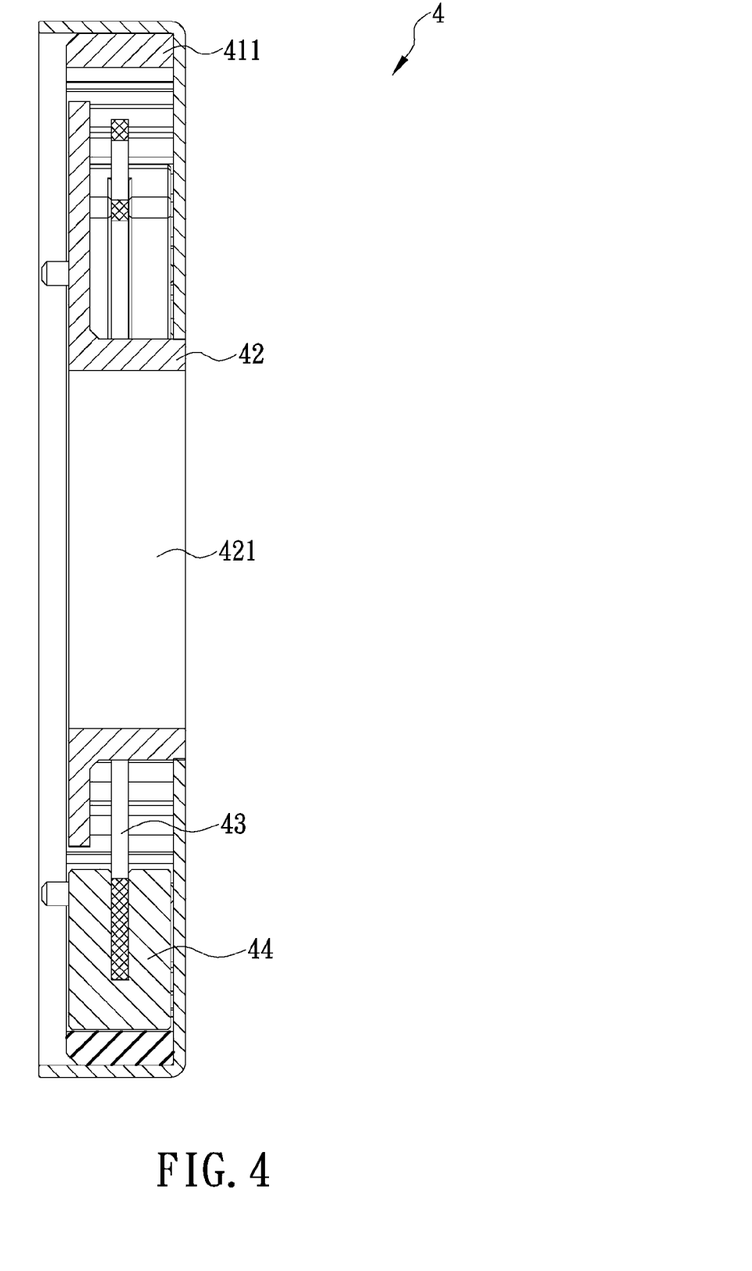
FIG. 4 is a schematic of a clutch mechanism of the clutch-type electric generator of the invention.
Figure 6:
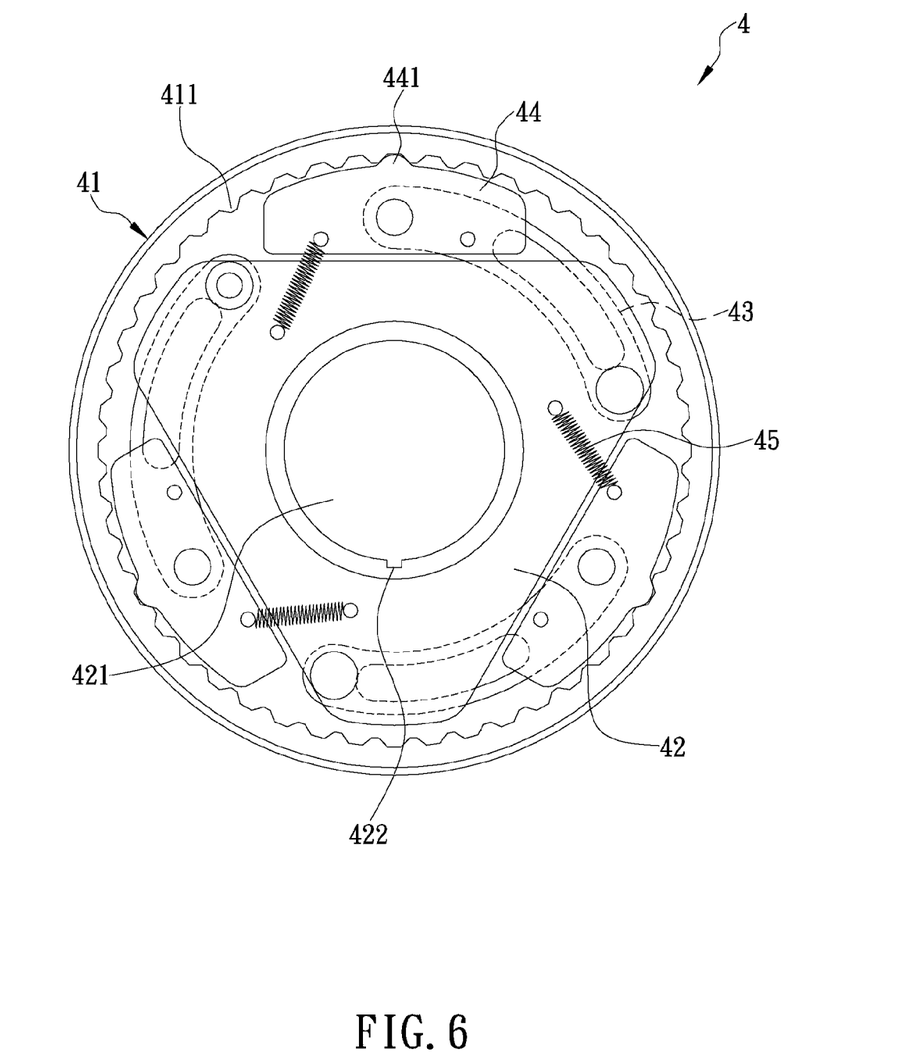
FIG. 6 is another operation schematic of the clutch-type electric generator of the invention.

On the contrary, referring to FIG. 2, FIG. 4, and FIG. 6, when the rotation speed of the clutch disc 42 (i.e., the rotation speed of the axle 21 or the wheel 22) is able to generate a sufficient centrifugal force for the plurality of clutch shoes 44 to overcome the elastic force, an outer rim of the each of the plurality of clutch shoes 44 is pressed against the inner rim of the passive ring 41 by the centrifugal force so that the plurality of second engagement parts 441 engages and meshes with the corresponding plurality of first engagement parts 411 and thus the passive ring 41 along with the rotor housing 33 rotate with the axle 21 (as shown in FIG. 6); at this time, the plurality of rotors 331 on the rotor housing 33 rotates along with the axle 21 as the center and generates a time-varying magnetic field and subsequently generates induced electricity on the plurality of stators 321, where the induced electricity is stored in the power module.

Since the rotation speed of the clutch disc 42 must exceed a predetermined value to generate sufficient centrifugal force for the plurality of first engagement parts 411 and the plurality of second engagement parts 441 to engage and mesh and drive the plurality of rotors 331 to generate induced electricity, when the automobile has just started and the speed has not reached a predetermined speed yet, the elastic force of the plurality of elastic devices 45 restricts the plurality of clutch shoes 44 on the outer rim of the clutch disc 42 so that the plurality of second engagement parts 441 on the plurality of clutch shoes 44 does not engage and mesh with the corresponding plurality of first engagement parts 411, which ensures that the minor kinetic energy generated when the automobile has just started is not consumed on driving the clutch-type electric generator 3 and avoids issues of excess load and energy consumption.

Subsequently, when the rotation speed of the clutch disc 42 exceeds the predetermined value, the automobile is in a transition state from low speed to moderate speed and has substantial values of inertia and momentum; therefore, the axle 21 accordingly drives the passive ring 41 and the rotor housing 33. Thusly, the issue of requiring significant kinetic energy to overcome the torsion and torque of the clutch mechanism 4 generated by static friction when the automobile has just started may be avoided (the power module of the automobile must output larger currents to start the engine in the driving module when the torsion and torque are too high).

It is worthy to note that in the above embodiments, the clutch-type electric generator 3 is installed on a four-wheel-drive automobile, i.e., all of the axles 21 are "active axles" that may directly receive kinetic energy from the driving module via the transmission module; however, the invention may also be used in other types of automobiles. For example, the clutch-type electric generator 3 may be installed on a passive axle of a two-wheel-drive automobile and the kinetic energy is transmitted from the wheel to the axle when the automobile proceeds, and therefore the same principle may still be used to generate electricity to provide the power required by the interior equipment and reduce fuel consumption. Similarly, the invention may also be used in automobiles employing alternative energy sources such as electric automobiles and hybrid electric automobiles to enhance the energy utilization efficiency of the automobile, and the number and cost of allocated batteries may be reduced to improve the mileage on single charge and substantially reduce the charging frequency and increase battery lifespan.

Since the clutch-type electric generator 3 of the invention generates electricity by using the kinetic energy generated by the axle 21 under high-speed rotation, it may be easily installed on all types of contemporary automobiles and the present automobile structure does not need to be significantly modified; in addition, the clutch-type electric generator 3 may be installed on multiple axles 21 of the automobile (either active axles or passive axles) so that multiple clutch-type electric generators 3 may be used to generate electricity and further improve the rate and capability of electricity generation.

Furthermore, referring to FIG. 2 and FIG. 3, in the above embodiments, the clutch-type electric generator 3 is packaged into a single component to be directly fixed to the suspension device 23 and penetrated by the axle 21, and thus components such as the stator housing 32 and the rotor housing 33 have annular shapes with hollow centers (as shown in FIG. 3). However, to improve the convenience of assembling the clutch-type electric generator 3, the shapes of the casing 31, the stator housing 32, and the rotor housing 33 may also be changed; for example, the casing 31 may be separated into an upper casing and a lower casing and the stator housing 32 may be designed as two semi-annular components which are configured in the upper casing and the lower casing, respectively. Therefore, the clutch-type electric generator 3 may be installed on the axle 21 from above and below by assembling and fixing from above and below the axle 21.

Referring to FIG. 5, the shape of the clutch disc 42 is designed to be polygonal (triangular in this embodiment) so that the plurality of clutch shoes 44 is steadily rotated by the clutch disc 42, and each of the plurality of clutch shoes 44 is pressed against the outer rim of the clutch disc 42 so that the outer rim of the clutch disc 42 properly presses against and rotates the plurality of clutch shoes 44 when the clutch disc 42 rotates to enhance the operation stability of the clutch-type electric generator 3.

While the invention herein disclosed has been described by means of specific embodiments, numerous modifications and variations could be made thereto by those skilled in the art without departing from the scope of the invention set forth in the claims.

What is claimed is:

1. A clutch-type electric generator for automobile axles, applied to an automobile configured with at least a driving module and a power module, wherein kinetic energy generated by the driving module is transmitted to a plurality of axles and a plurality of wheels of the automobile for driving the axles and wheels to rotate when the driving module is operating, wherein the clutch-type electric generator comprises:

a casing having an outer rim fixed to a chassis or a suspension device of the automobile, and configured with a containing space inside; wherein the axle penetrates the casing and rotates with respect to the casing;

a stator housing configured in the containing space and fixed to an inner rim of the casing; wherein the stator housing is configured with a plurality of stators along the perimeter of the axle, and the plurality of stators are electrically connected to the power module;

a rotor housing configured in the containing space and movably configured around an outer rim of the axle by a bearing; wherein the rotor housing is configured with a plurality of rotors along the perimeter of the axle, and each of the plurality of rotors corresponds to each of the plurality of stators and keeps a predetermined gap with each of the plurality of stators, respectively; and a clutch mechanism configured in the containing space and comprising:

a passive ring having a side concentrically fixed on a side of the rotor housing so that the passive ring and the rotor housing simultaneously rotate with respect to the axle; wherein an inner rim of the passive ring is configured with a plurality of first engagement parts along the perimeter thereof;

a clutch disc configured around the outer rim of the axle to simultaneously rotate with the axle;

a plurality of connecting rods each having an end pivotally connected to the clutch disc;

a plurality of clutch shoes each pivotally connected to the other end of the corresponding connecting rod, to move between an outer rim of the clutch disc and the inner rim of the passive ring; wherein each of the clutch shoes is configured with a second engagement part corresponding to each of the first engagement parts, respectively; and a plurality of elastic devices each having an end connected to the clutch disc and the other end correspondingly connected to each of the clutch shoes, respectively, to apply elastic force on the clutch shoes so that a side of each of the clutch shoes opposite to the second engagement part presses against the outer rim of the clutch disc to keep a predetermined distance between each of the first engagement parts and each of the second engagement parts.

2. The clutch-type electric generator as claimed in claim 1, wherein the stator is a coil and the rotor is a field magnet.

3. The clutch-type electric generator as claimed in claim 2, wherein the shape of the clutch disc is polygonal and each of the clutch shoes presses against the outer rim of the clutch disc.

4. The clutch-type electric generator as claimed in claim 1, wherein a penetrating hole is configured at the center of the clutch disc, and the penetrating hole is configured with an engagement groove to engage with the axle when the axle penetrates the penetrating hole so that the clutch disc is rotated by the axle.

5. The clutch-type electric generator as claimed in claim 2, wherein a penetrating hole is configured at the center of the clutch disc, and the penetrating hole is configured with an engagement groove to engage with the axle when the axle penetrates the penetrating hole so that the clutch disc is rotated by the axle.

6. The clutch-type electric generator as claimed in claim 3, wherein a penetrating hole is configured at the center of the clutch disc, and the penetrating hole is configured with an engagement groove to engage with the axle when the axle penetrates the penetrating hole so that the clutch disc is rotated by the axle.

* * * * *